D. B. WILLIAMS.
NUT CRACKING MACHINE.
APPLICATION FILED MAY 15, 1915.
1,238,238.
Patented Aug. 28, 1917.
3 SHEETS—SHEET 1.
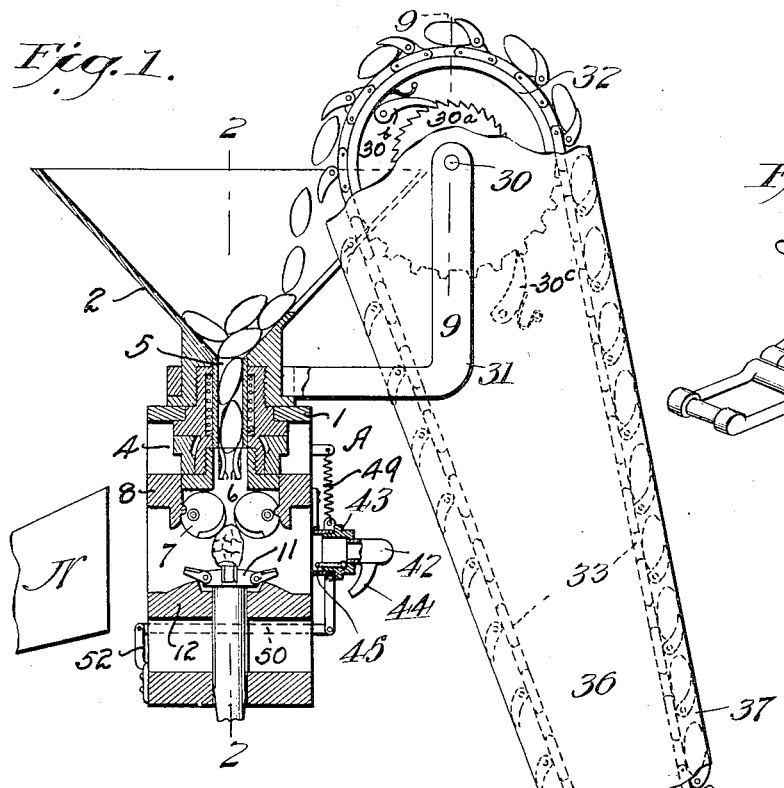
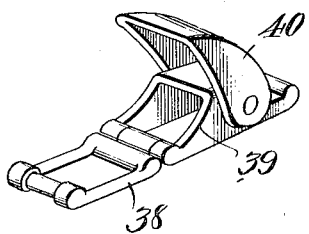
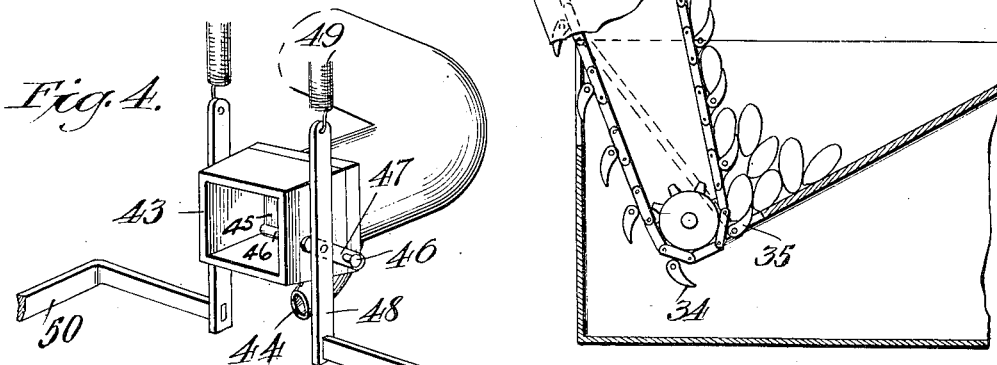
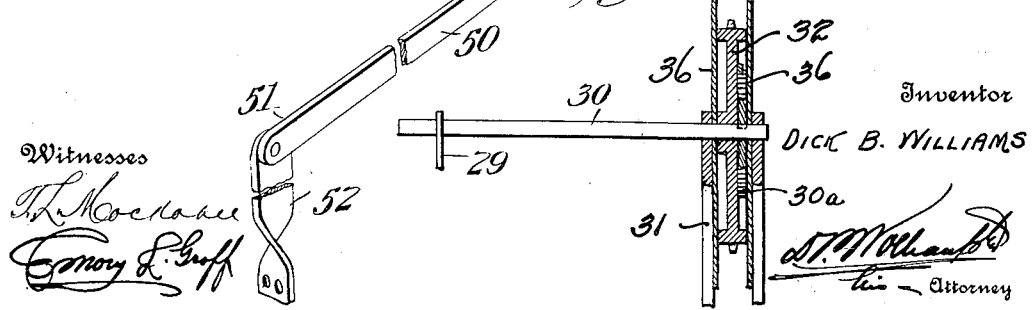
Inventor
DICK B. WILLIAMS

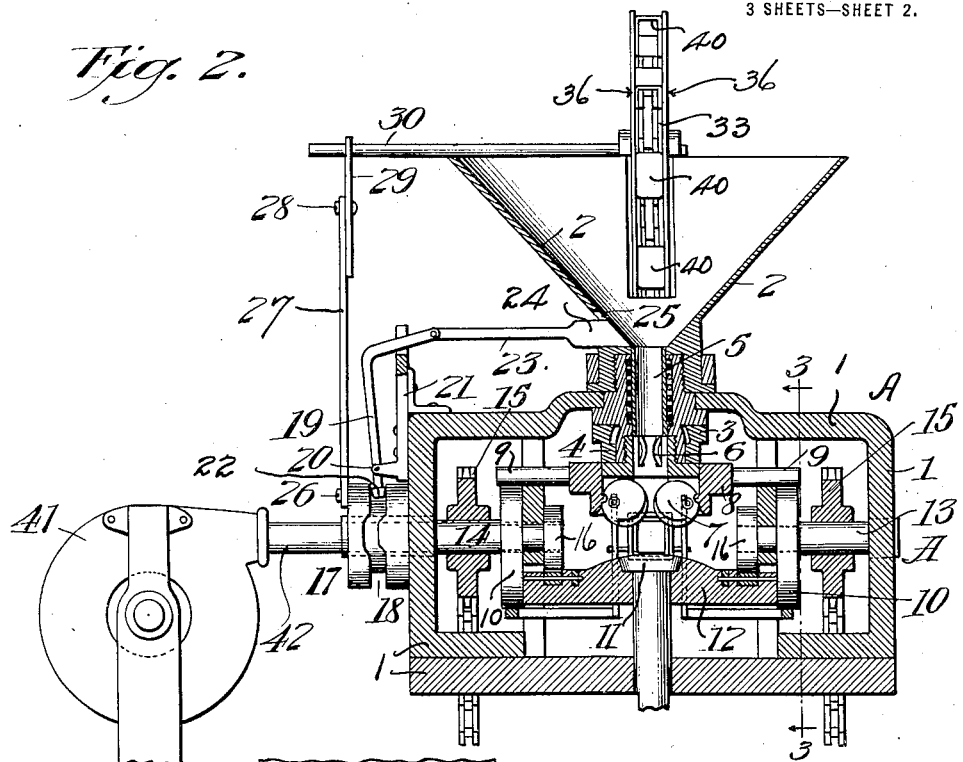

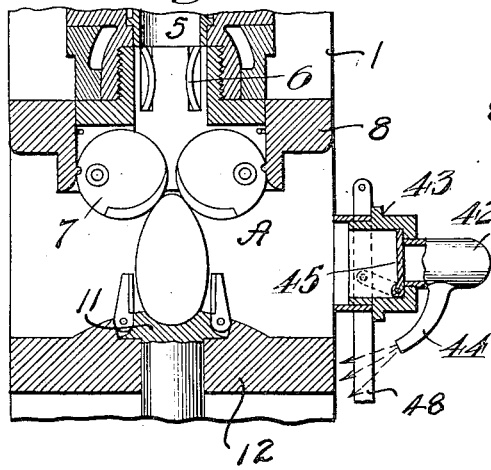
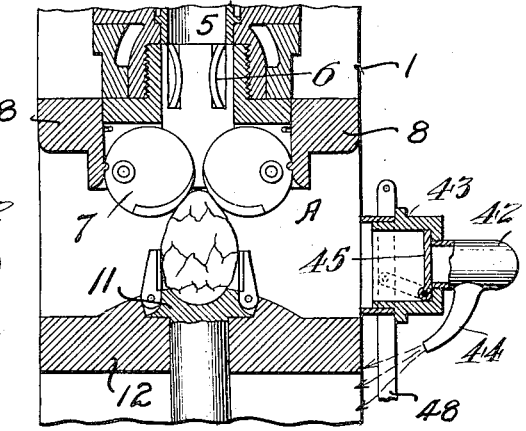
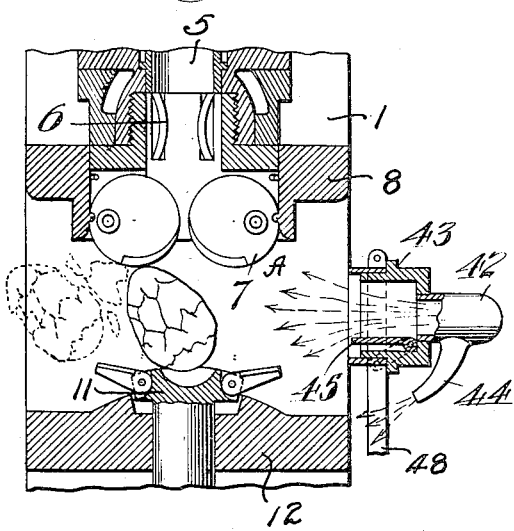
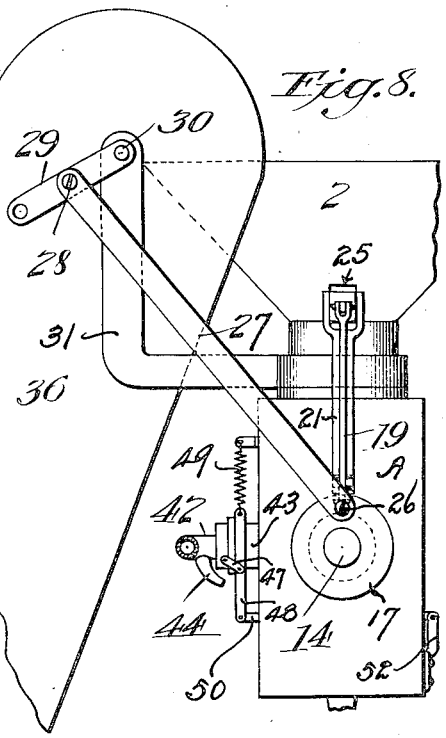

UNITED STATES PATENT OFFICE.

DICK B. WILLIAMS, OF NEW ORLEANS, LOUISIANA, ASSIGNOR TO LOUISIANA NUT AND PRODUCE COMPANY, OF NEW ORLEANS, LOUISIANA, A CORPORATION OF LOUISIANA.

NUT-CRACKING MACHINE.

1,238,238.  Specification of Letters Patent.  Patented Aug. 28, 1917.

Application filed May 15, 1915. Serial No. 28,356.

*To all whom it may concern:*

Be it known that I, DICK B. WILLIAMS, a citizen of the United States, residing at New Orleans, in the parish of Orleans and State of Louisiana, have invented certain new and useful Improvements in Nut-Cracking Machines, of which the following is a specification.

This invention relates to an improvement in nut cracking machines particularly of the type disclosed in my former Patent No. 1,132,817, granted March 23, 1915.

To this end the invention primarily has in view a novel construction and arrangement of instrumentalities which greatly facilitate the handling of the nuts one at a time, and the ejection of the cracked nut in the best possible condition for separating the broken shell particles from the meats with a minimum amount of injury to the latter.

A further object of the invention is to provide a compact and consolidated cracking mechanism and feeding means which automatically handles the nuts one at a time or in single order, thereby preventing overfeeding and insuring a reliable action in placing one nut at a time into position for cracking, and then discharging or ejecting the cracked nut by means of a blast of air which is utilized as a means for feeding the cracked nut to a shelling or separating device, while at the same time blowing away freed shell particles and keeping the cracking mechanism entirely clear of accumulations of pieces of shell and debris.

A more general object of the invention is to provide a novel and practical combination of instrumentalities which are so related and synchronized that each function of the machine is properly timed, thus insuring accuracy of operation, as well as the cracking of the individual nuts in a manner that will permit the ready separation of the shell particles from the kernels and the recovery of the latter in substantially undamaged halves.

A further object is to provide a device of the character indicated that is simple in construction and reliable in its operation, and which is capable of handling with facility all commercial grades of nuts, thus adapting the invention to a wide range of practical uses.

With the above and other objects in view which will more readily appear as the nature of the invention is better understood, the same consists in the novel construction, combination and arrangement of parts hereinafter more fully described, illustrated and claimed.

A preferred and practical embodiment of the invention is illustrated in the accompanying drawings, in which—

Figure 1 is a vertical longitudinal sectional view of a nut cracking mechanism, embodying the improvements contemplated by the present invention.

Fig. 2 is a vertical sectional view of the machine on the line 2—2 of Fig. 1.

Fig. 3 is an enlarged detail sectional view on the line 3—3 of Fig. 2.

Fig. 4 is a detail perspective view of the air-blast nozzle, and the means by which the valve thereof is controlled.

Fig. 5 is a diagrammatic view of the cracking mechanism and its air blast ejector showing the relation of parts with a single nut clamped in position for cracking.

Fig. 6 is a view similar to Fig. 5 illustrating the compression head advanced to the extent of its compression stroke thereby cracking the shell of the nut.

Fig. 7 is a view similar to Figs. 5 and 6 illustrating the compression head lowered and the air blast device open to provide for the forcible ejection of the cracked nut by the blast or pressure of air.

Fig. 8 is a detail elevation of the operating connection with the upper sprocket of the feeding conveyer.

Fig. 9 is a detail sectional view on the line 9—9 of Fig. 2 illustrating one form of a pawl and ratchet mechanism that may be employed for imparting rotary motion to the upper sprocket of the feeding conveyer.

Fig. 10 is a detail perspective view of a portion of the conveyer chain, clearly illustrating the single nut holders carried thereby.

Similar reference characters designate corresponding parts throughout the several figures of the drawings.

The improvements contemplated by the present invention are consolidated in a nut cracking machine including in its general organization a nut cracking mechanism designated by the reference letter A, and preferably of the character disclosed in my aforesaid Patent No. 1,132,817, and a feeding mechanism constituting a part of the nut cracking mechanism, which latter mechanism has means for positively and reliably feeding the nuts singly into the cracking zone as well as effectively preventing more than one nut at a time from moving into position for cracking, while at the same time keeping the machine clear and free from choking. The nut cracking machine also includes in combination with the nut cracking mechanism and the segregating feeder, an automatic air blast ejector B, the relation and operation of these associated instrumentalities being hereinafter more particularly referred to.

With reference to the embodiment shown in the drawings, it will be observed that the numeral 1 designates a substantially rectangular framework of the nut cracking mechanism A, which supports a receiving hopper 2 and the segregating feeder device designated in its entirety by the numeral 3.

This segregating feeder device 3 primarily comprises a feeder head 4 having a passageway 5 communicating with the hopper 2, which passageway at its lower end is controlled by means of a plurality of check disks 6. These disks serve to restrain the nuts in the passageway 5 and hopper 2, when a nut is being delivered into the cracking zone, by means of the delivery disks 7 which are pivotally mounted in a lower portion of the feeder head 4. The two sets of disks 6 and 7 are controlled by the movement of a vertically reciprocating closing device or collar 8 slidably embracing the outer section of the feeder head 4, as fully disclosed in my pending application Serial No. 867,444. This closing device or collar is provided with the oppositely extending operating arms 9, the extreme ends of which contact with the peripheries of the actuating cams 10. It will thus be apparent that as the collar 8 rises and falls on the peripheries of the cams 10, the disks 6 and 7 are actuated to deliver a single nut into the cracking zone and onto the compression head or anvil 11 of the vertically movable anvil carrier 12. In connection with the actuating cams 10, it will be observed that the same are mounted on stub shafts 13 and 14 respectively, which receive their power through the chain and sprocket devices 15 which are connected with a source of power, (as shown in my prior Patent No. 1,132,817). These shafts are suitably journaled in the framework 1 and in addition to the actuating cams 10 carry at their inner ends other cams 16 which affect the movement of the vertically movable anvil carrier 12 in one direction as explained in my said patent.

The shaft 14, unlike the shaft 13, extends beyond the framework 1 and is provided with a nut feed controlling wheel 17 having a cam groove 18 in its periphery for the purpose of imparting the necessary motion to the angular lever member 19 of an agitator device to be presently referred to. By reference to Fig. 2 of the drawings, it will be observed that the lever arm 19 is pivoted as at 20 on a bracket 21 carried by the framework of the machine A, and has its lower end 22 disposed within the cam groove 18 so that rotation of the wheel 17 will oscillate the arm 19 on its pivot 20, thus imparting a reciprocating motion to a clearing finger 23 connected with the upper end of the lever 19. This clearing finger 23 has a beveled displacing head 24 working in a slot 25 in the hopper 2, and operating across the top or mouth of the passageway 5 of the segregating feeder to straighten or set up the nuts fed into the hopper so that they will properly enter into the passageway 5. That is to say, the function of the displacing head or element 24 is to keep the entrance to the passage clear, and rectify the position of the nuts thus preventing the same from being wedged crosswise or the like, through a reciprocating or clearing movement imparted by the lever 19 which is synchronously operated with the cracking mechanism.

The outer face of the feed control wheel 17 has pivoted thereto, as indicated at 26, a link 27 which in turn is pivoted as at 28 to an arm member 29 rigidly carried on a conveyer operating shaft 30. It will be apparent that with this connection between the conveyer operating shaft 30 and the feed control wheel 17 that a reciprocating motion will be imparted to the shaft, so that in order to provide a continuous feed for the conveyer device any suitable ratchet mechanism may be employed. The said conveyer operating shaft 30 is preferably supported in a bracket arm 31 having one end clamped to the frame work of the nut-cracking device as shown in Fig. 1 and has mounted thereon a sprocket wheel 32.

The ratchet mechanism above referred to may be constructed as shown in Figs. 2 and 9 wherein a propelling ratchet disk 30ᵃ is keyed to the shaft 30 so as to turn therewith, and operates or propels the wheel 32, which is loosely mounted on the shaft, through the medium of a spring pressed feeding pawl 30ᵇ pivotally carried by the sprocket 32. Thus, as the ratchet disk 30ᵃ reciprocates with the shaft 30 it imparts a rotary movement to the sprocket 32 in the direction of the arrow, Fig. 1. To prevent movement of the sprocket in the wrong direction, which would effect a retrograde movement of the feeding conveyer, a spring pressed check pawl 30ᶜ is pivoted in the conveyer housing so as to engage the sprocket teeth as shown. Accordingly, it will be seen that the conveyer device will be actuated by the wheel 32, to which an intermittent movement in the same direction, or a continuous rotary movement, will be given by the shaft 30 through the ratchet mechanism.

The conveyer device also includes a conveyer chain 33 which engages with the upper sprocket wheel 32, and also with a lower sprocket wheel 34 conveniently arranged in a bin or other supply container 35, and opposite side members 36 of a chain casing C, coöperate to provide a guide or runway 37 in which the said conveyer or belt 33 operates. As will be observed more particularly from Figs. 1, 2 and 5, the conveyer chain 33 is made up of a plurality of links 38, certain of which are provided with a sprocket tooth housing 39, to which is pivoted a nut holder preferably in the form of a small cup 40. These nut holders are each designed to hold a single nut, and during the operation of the machine, pick up the nuts singly from the hopper of the bin 35, as can best be observed from Fig. 1. It will be noted that the nuts are singly removed from the nut bin or receptacle, and transferred, one by one, to the hopper of the machine, where they are worked or jostled about by means of the head 24 of the clearing finger into such a position that they will enter the passageway 5 in the proper manner.

The single nuts which are intermittently delivered by the segregating feeder into the cracking zone are caught between the opposing compression members 7 and 11, and subjected to a compression stroke of constant extent, as pointed out and explained in my said Patent No. 1,132,817. However, in this connection, it is to be observed that the lower compression member or anvil-head 11 is formed in its upper side with a nut-receiving seat $x$ which receives one end of the nut being acted upon, and the peripheral edge $v$ of this seat forms a knife edge. This edge has the effect of positively "cupping" the lower end of the nut when the compression stroke is applied thereto. That is to say, it cuts into the lower end portion of the nut with the result of positively loosening and breaking the cap of the nut at that end. At the same time, the position of the nut, and the manner in which it is compressed, cause a fracture thereof about the central portion with cracks running to the cupped end. This breaks up the shell body into a large number of cracks and sections, so that when the air blast ejector comes into play and blows the cracked nut bodily out of the cracking zone, some of the shell particles are usually separated from the nut. In this cracking operation, it is also usually the case that the upper end of the nut while not definitely cupped or cut as at the lower end, will also be cracked and thereby facilitate the complete separation of the shell particles from the meats without substantial injury to the latter.

After a nut has been suitably cracked between the anvil-head 11, and the anvil formed by the delivery disks 7 in the cracking zone, the said head 11 is lowered, thus bringing the nut out of engagement with the delivery disks 7. At the same time the movable anvil carrier 12 is also lowered through the medium of the cams 16, thus releasing the centering fingers 11$^a$ which have been holding the nut permitting the same to open up to effect the easy removal of the nut from the cracking zone.

The removal or ejection of the nut is accomplished through the medium of the air blast device B, which primarily includes a fan or blower element 41 having connected thereto a tube or air conduit 42 provided at its end with a blast nozzle 43 which is adapted to discharge directly across the cracking zone of the nut cracking mechanism A that is between the compression or anvil members 7 and 11.

The blast nozzle 43 is intended to be operated only at certain intervals, or in other words, it is only operative after a nut has been cracked and the several parts of the cracking mechanism are in the position shown in Figs. 1 and 7, for the purpose of sweeping the nut from the cracking zone into the receiving hopper of a nut shelling and separating device N, which forms the subject of another pending application Serial No. 20,257, filed April 7, 1915. However, in order to further utilize the presence of the air blast, to keep the machine free from small shell particles and other debris, the air conduit 42 is provided at one side of its junction with the blast nozzle 43 with a depending auxiliary discharge nozzle 44 deflected toward the lower portion of the air blast mechanism, and thereby adapted to continuously discharge a jet of air around and beneath the vertically reciprocating anvil carrier member 12, thus tending to keep the lower part of the nut cracking device clean and clear of much dust and shell particles that would otherwise collect.

For the purpose of controlling the discharge of the main blast nozzle 43, at internals, the same is provided with an internal valve member 45 which normally closes the end of the conduit 42, and carries opposite spindle portions 46 which project through the casing of the nozzle. These spindle portions 46 are rigidly connected with an arm 47 pivotally connected to the vertical valve actuating arms 48 having at their upper end tensioning springs 49, and connected at their lower ends with the laterally projecting angular presser arms 50. The said presser arms 50 are so arranged with respect to the cams 10 that the peripheries of the latter ride directly on the upper surfaces thereof, and are pivotally connected at their ends 51 with a fulcrum member 52 which is secured to the framework of the machine. With this construction of valve operating means, it will be apparent that the springs 49 exert a tension which normally holds the valve 45 in its closed position, and when the cams 10 are rotated so that their peripheries bear on the upper edges of the arms 50, the portion of the latter connected with the arm 48 will move downwardly as indicated by dotted lines in Fig. 3, since the arms are pivoted on the fulcrum supports 52. The downward movement of the arms 48 will cause the valve stem to turn, and open the valve 45, thus permitting a blast of air to sweep across the cracking zone and bodily throw a nut into the hopper N of the sheller and separator. In connection with the operation of this air blast it will be noted that the same occurs when the delivery disks 7 are closed, and the anvil 11 and anvil carrier 12 are in their lowermost position, and immediately prior to the beginning of their returning to position for receiving a fresh nut to be cracked. Thus, as the parts 11 and 12 move into position to receive a nut to be cracked, the air blast is automatically shut off, so as to not blow out the uncracked nut. This is clearly illustrated in the series of diagrams of Figs. 5 to 7 inclusive.

From the foregoing description, it is thought that the many features and advantages of the invention will be readily apparent, and in all embodiments of the invention, it may be noted that the same comprises a nut cracking device to which nuts are fed singly from a nut receptacle, and are positively agitated so as to properly feed into the machine and not choke or clog the same. Furthermore, the invention provides for the removal of the cracked nut by means of an air blast which operates in synchronism with certain elements of the cracking device, thus insuring accuracy of operation, and maintaining an even standard of efficiency for the machine.

It will of course be understood that minor changes in the form, proportion and details of construction may be resorted to without departing from the spirit of the invention or scope of the appended claims.

I claim:

1. In a nut cracking machine, a shell cracking mechanism, a feeding mechanism, a valved air blast ejector, and synchronized means for operating respectively the cracking mechanism, the feeding mechanism, and the valve of the ejector.

2. In a nut cracking machine, a shell cracking mechanism, an air blast ejector for the cracked nuts, and operating means for releasing the air blast simultaneously with the release of the nuts in the cracking mechanism.

3. In a nut cracking machine, a shell cracking mechanism, and an intermittently operating air blast ejector for the cracked nut.

4. A nut cracking machine, including shell cracking mechanism, a valved air blast ejector for the cracked nut, and means for intermittently operating the valve of the ejector.

5. A nut cracking machine, including shell cracking mechanism, a valved air blast ejector, and a single machine element having timed operating connections respectively with the cracking mechanism and with the valve of the ejector.

6. A nut cracking machine including shell cracking mechanism, and an air blast ejector device having an intermittently-operative blast and a constantly-operative blast.

7. A nut cracking machine, including slell cracking mechanism, and an air blast ejector device having an intermittently-operative blast nozzle discharging across and through the cracking zone, and also having an auxiliary constant blast nozzle discharging onto the cracking mechanism.

8. A nut cracking machine, including a shell cracking mechanism, an air blast ejector device having a main nozzle discharging through the cracking zone, and an auxiliary nozzle discharging onto the cracking mechanism, a constant source of air-supply for both nozzles, a normally closed valve controlling the discharge from the main nozzle, operating connections for opening the valve, and a machine element operatively connecting with the cracking mechanism and with said operating connections for the valve.

9. A nut cracking machine, including a shell cracking mechanism, an air blast ejector device having a normally closed valve, operating connections for said valve, and a single shaft element having a cam operatively engaging with the cracking mechanism and with said operating connections for said valve.

In testimony whereof I hereunto affix my signature in the presence of two witnesses.

DICK B. WILLIAMS.

Witnesses:
D. A. DONNELLY,
A. C. LECOUTE.